US007721857B2

(12) United States Patent
Harr

(10) Patent No.: US 7,721,857 B2
(45) Date of Patent: May 25, 2010

(54) ARRANGEMENT RELATED TO A SWING DAMPER

(75) Inventor: Joakim Harr, Umea (SE)

(73) Assignee: Indexator AB, Vindeln (SE)

( * ) Notice: Subject to any disclaimer, the term of this patent is extended or adjusted under 35 U.S.C. 154(b) by 952 days.

(21) Appl. No.: 10/530,158

(22) PCT Filed: Oct. 5, 2003

(86) PCT No.: PCT/SE03/01546

§ 371 (c)(1),
(2), (4) Date: Apr. 1, 2005

(87) PCT Pub. No.: WO2004/031067

PCT Pub. Date: Apr. 15, 2004

(65) Prior Publication Data

US 2006/0086685 A1 Apr. 27, 2006

(30) Foreign Application Priority Data

Oct. 7, 2002 (SE) .................................... 0202945

(51) Int. Cl.
*F16F 11/00* (2006.01)
*F16F 7/04* (2006.01)

(52) U.S. Cl. ........................... 188/381; 403/92; 403/93; 403/96; 403/97

(58) Field of Classification Search ................... 403/92, 403/93, 96, 97; 188/381
See application file for complete search history.

(56) References Cited

U.S. PATENT DOCUMENTS

| | | | |
|---|---|---|---|
| 3,168,874 | A | 2/1965 | Atanasoff |
| 4,417,759 | A | 11/1983 | Pierrot, III et al. |
| 4,715,641 | A | 12/1987 | Palmer |
| 5,026,248 | A | 6/1991 | Hamilton |
| 5,096,247 | A | 3/1992 | Killen |
| 5,110,169 | A | 5/1992 | Shepherd et al. |

(Continued)

FOREIGN PATENT DOCUMENTS

| | | |
|---|---|---|
| WO | 0053522 | 9/2000 |

*Primary Examiner*—Bradley T King
*Assistant Examiner*—Mahbubur Rashid
(74) *Attorney, Agent, or Firm*—Mark P. Stone

(57) ABSTRACT

The present invention relates to an arrangement and to a method relating to a swing damper (1) for carrying a tool (5) that hands from a crane arm (2) or the like. The swing damper (1) includes an upper part (11) that is connected to the crane arm (2), and a lower part (12) that carries a working implement (5) or the like either directly or via a rotator (4), for instance. The upper part (11) and the lower part (12) are pivotally connected to one another via a pivot joint (13). The swing damper (1) also includes a brake arrangement (50). The brake arrangement (50) includes a brake unit (60) that has discs (70, 80) which are pivotal about the pivot shaft (14) of the swing joint (13), wherein at least one (70) of said discs is secured against rotation relative to the upper part (11), and wherein at least (80) of said discs is secured against rotation relative to said lower part (12). The arrangement also includes a tensioning element (90; 110; 130) which functions to press the discs (70, 80) together in a braking operation. The brake unit (60) is situated in a space (200) between two pivot hearings (46) between the upper part (11) and the lower part (12).

20 Claims, 7 Drawing Sheets

U.S. PATENT DOCUMENTS 5,451,087 A * 9/1995 Beaulieu .................. 294/119.4
5,730,430 A 3/1998 Hodson et al.
H2012 H * 2/2002 Roth ........................... 403/57

* cited by examiner

ARRANGEMENT RELATED TO A SWING DAMPER

The present invention relates to an arrangement pertaining to a swing damper according to the preamble of Claim 1. The invention also relates to a method.

In conjunction with the use of swing dampers for supporting different types of tools suspended from a crane arm for example, it is endeavoured to achieve effective and reliable braking or damping of the pendulating/swinging movement that normally occurs when, for instance, manoeuvring the crane arm in carrying out different tasks.

Swing dampers can be used in connection with all conceivable types of tool that hang from the tip of a crane arm or jib, for example in respect of forest harvesters, forwarders, forest processors, timber cranes, excavating or digging machines, specialty machines, and so on. The swing damper may have a single and/or a double action, i.e. it can dampen/retard movement in one or two pendulous/swinging planes.

One object of the present invention is to provide a highly beneficial braking arrangement in respect of swing dampers, and also to provide a braking method. These objects are fulfilled by means of the arrangement and the method having the characteristic features set forth in respective accompanying Claims.

The following advantages are examples of the many advantages afforded by the present invention.

A swing damper that includes an inventive arrangement has a compact form.

There is achieved a smooth braking action and uniform wear of the wear-subjected components of the braking arrangement, and also highly beneficial bearing mounts from the aspect of load support among other things.

The brake arrangement has a long useful life and long adjustment intervals are made possible. The braking arrangement can be readily serviced.

Basic setting of desired braking moments can be readily achieved, as can also any required subsequent adjustment to the braking arrangement.

Braking elements can be replaced without needing to dismantle the tool from the tip of the crane arm.

Tensioning means/braking means and bearings are independent of each other. Replacement of disc brake units is effected quickly and effectively from the side, resulting in short service stoppages.

Inventive arrangements can be used in connection with both single-type and double-type swing dampers.

The position in which the disc brake unit is placed means that the unit will be protected against mechanical damage. The brake arrangement can be readily fitted in a subsequent process.

The inventive arrangement affords both technical and economical advantages.

Figure 1:
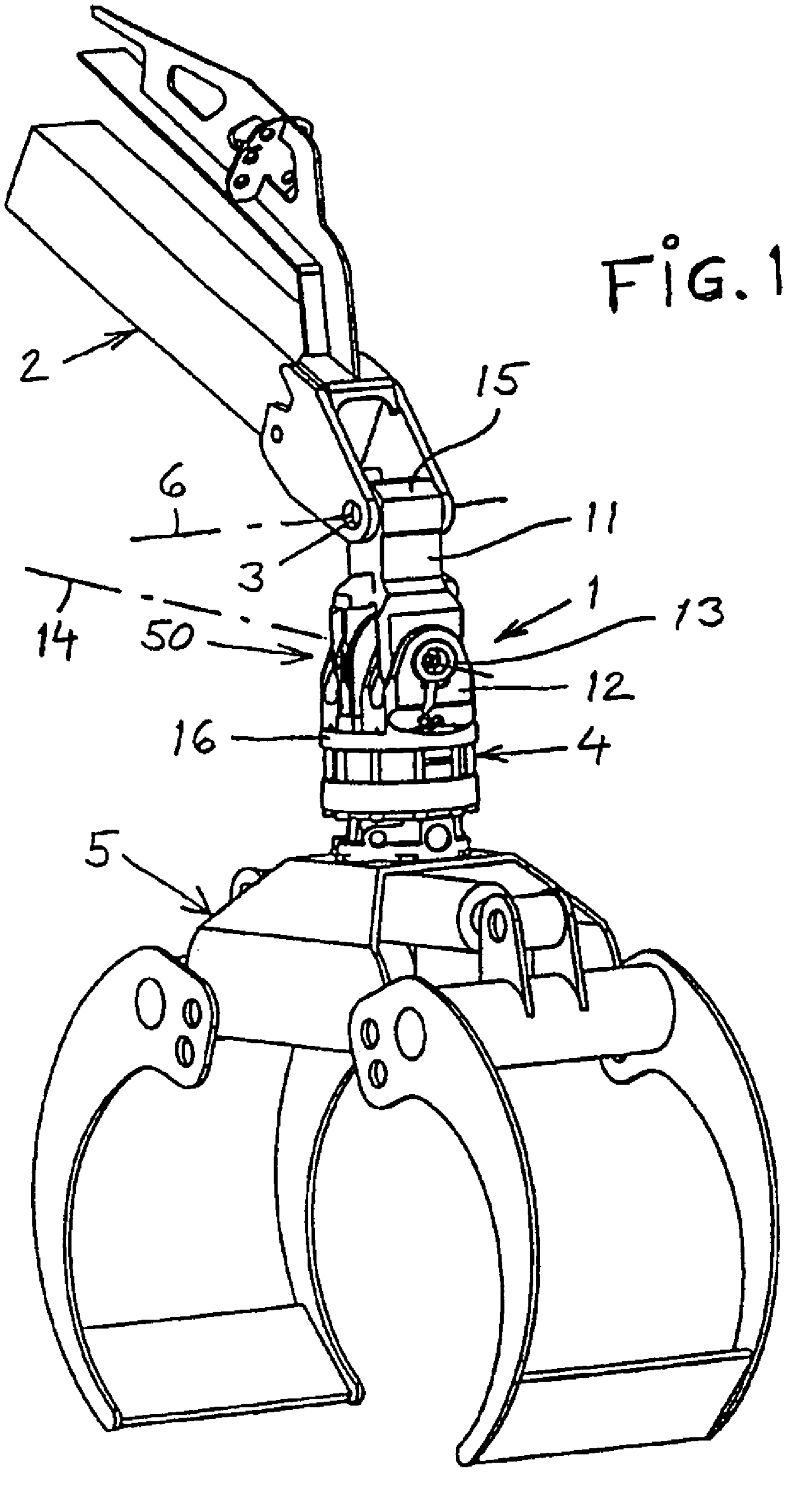
Figure 2:
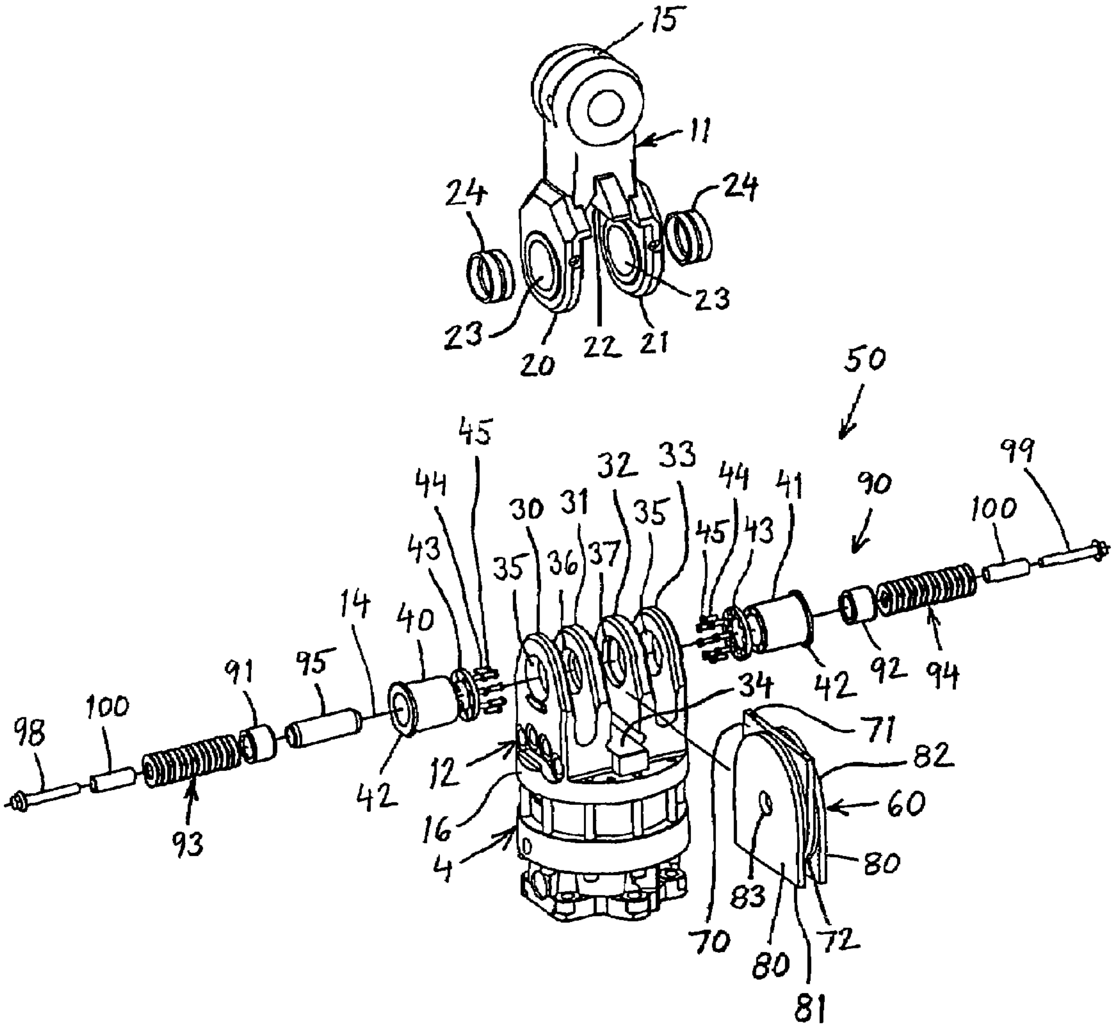
Figure 3:
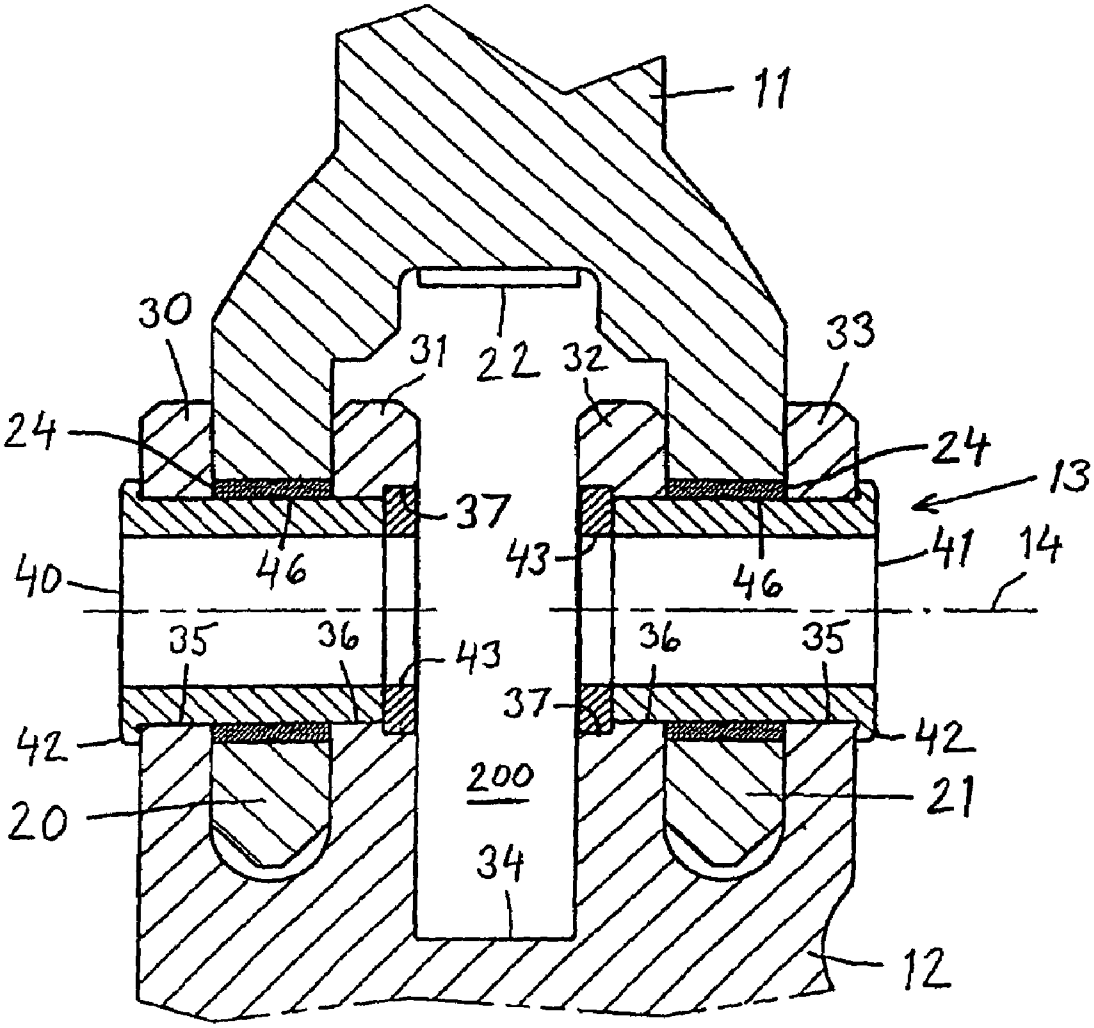
Figure 4:
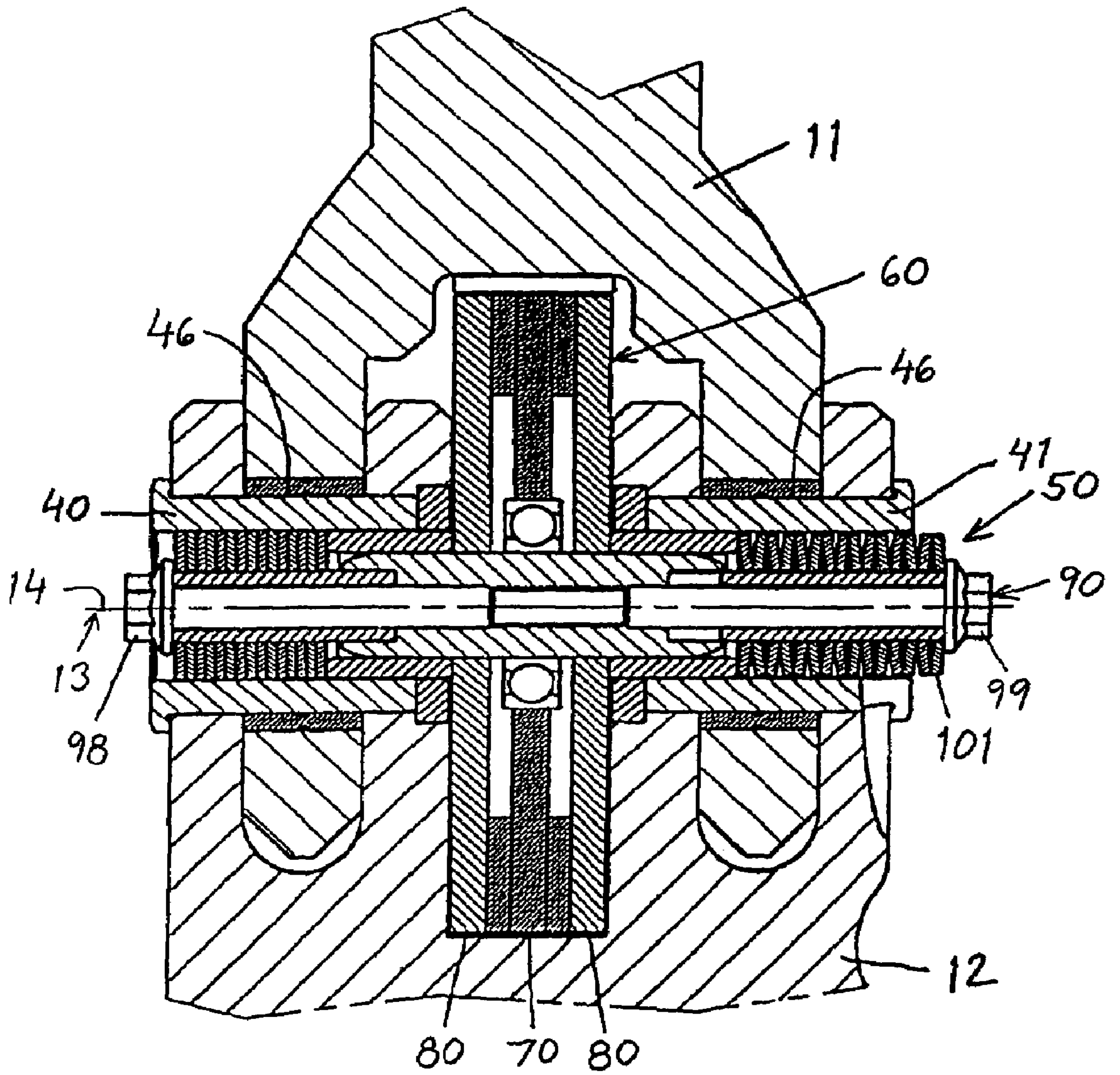
Figure 5:
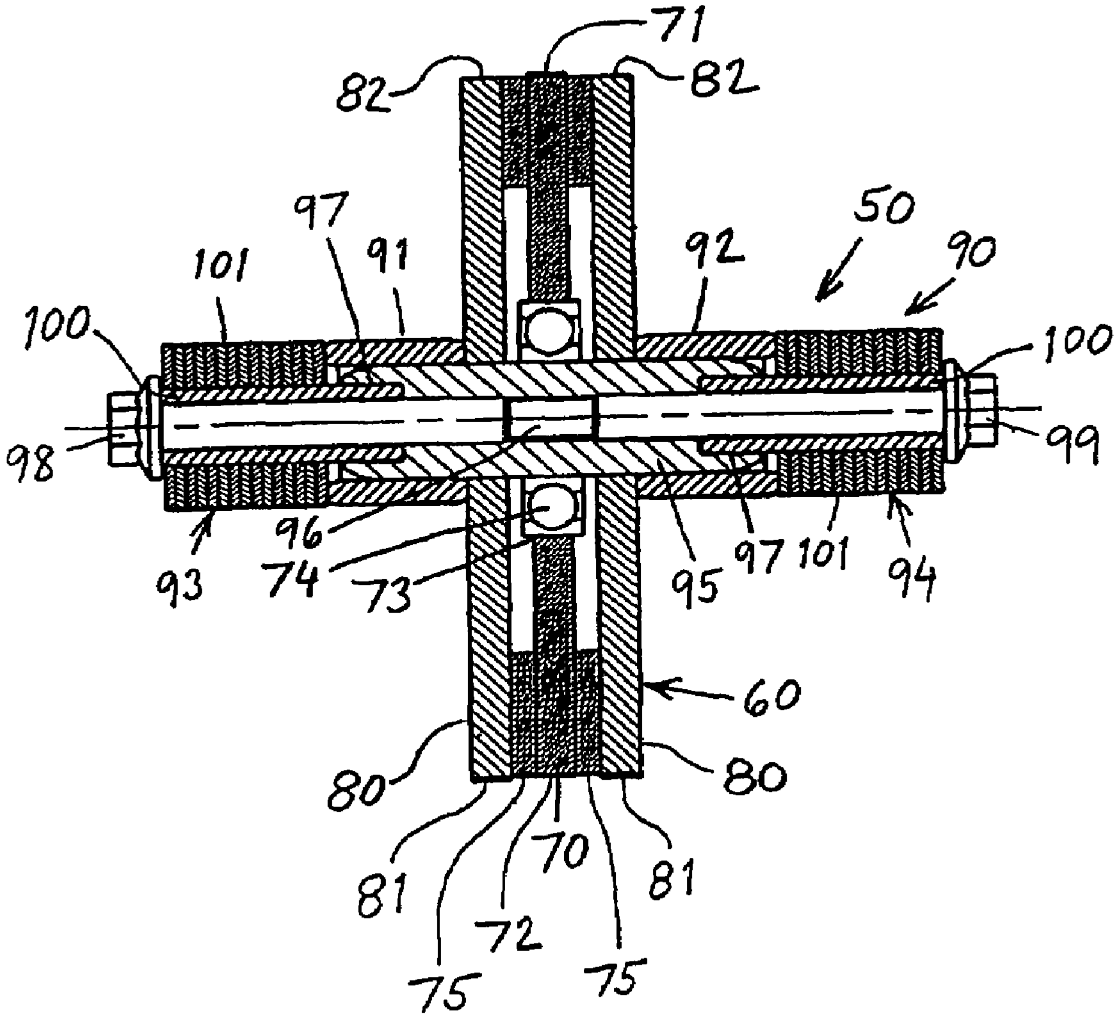
Figure 6:
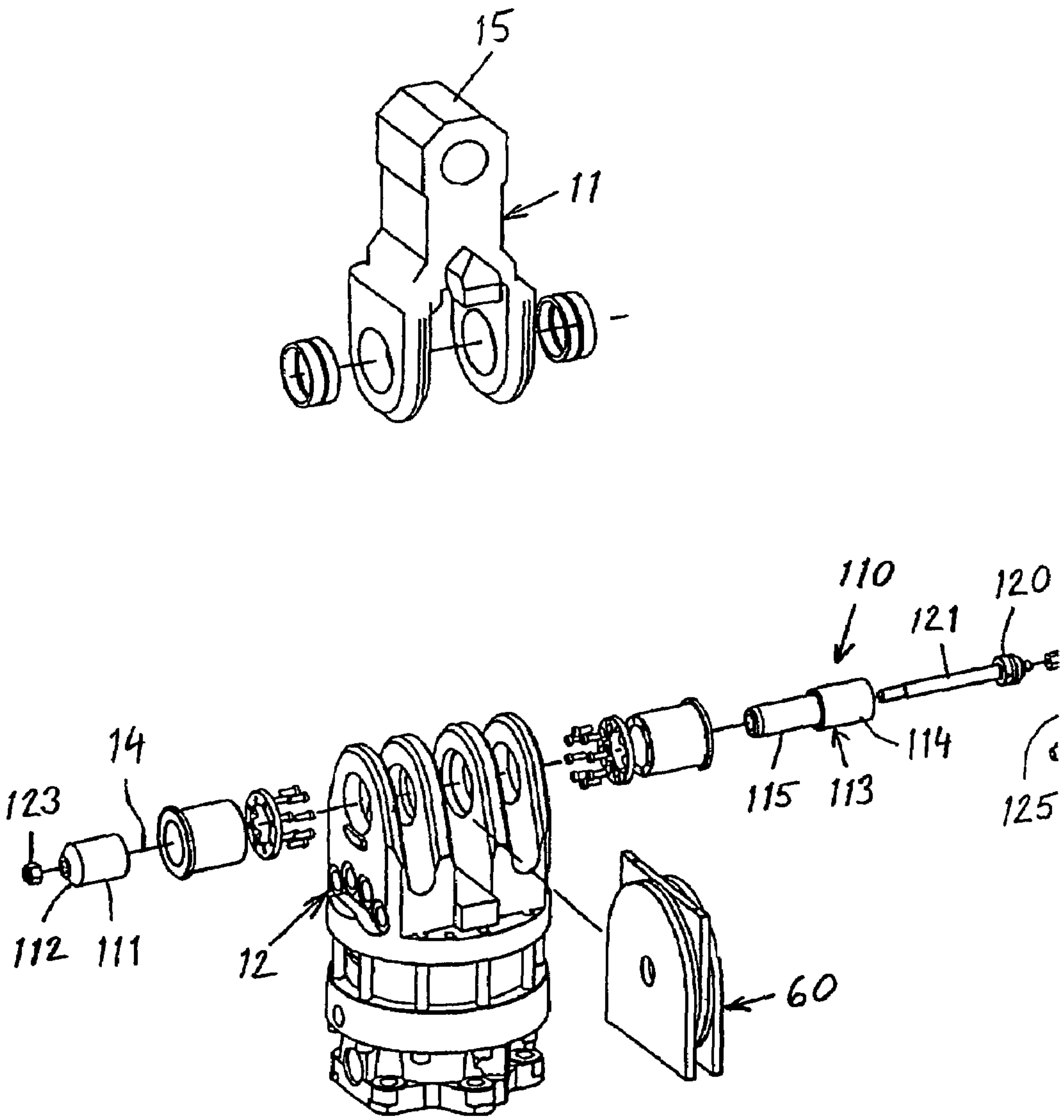
Figure 7:
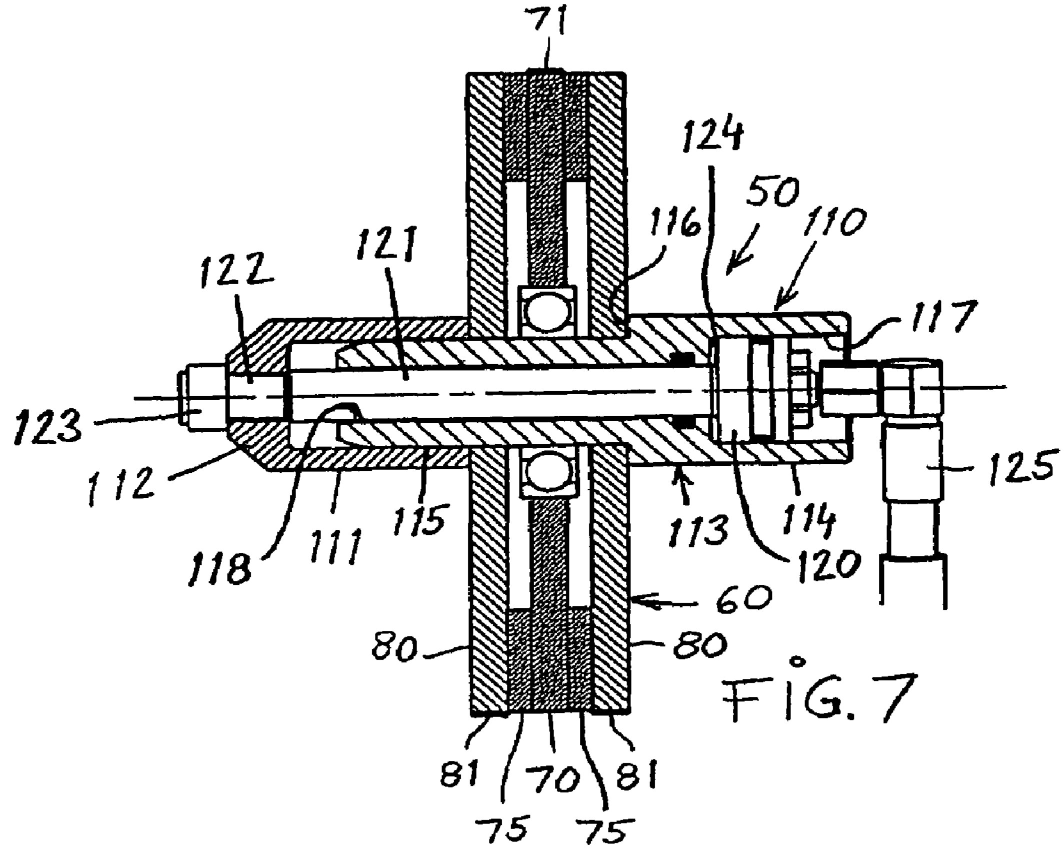
Figure 8:
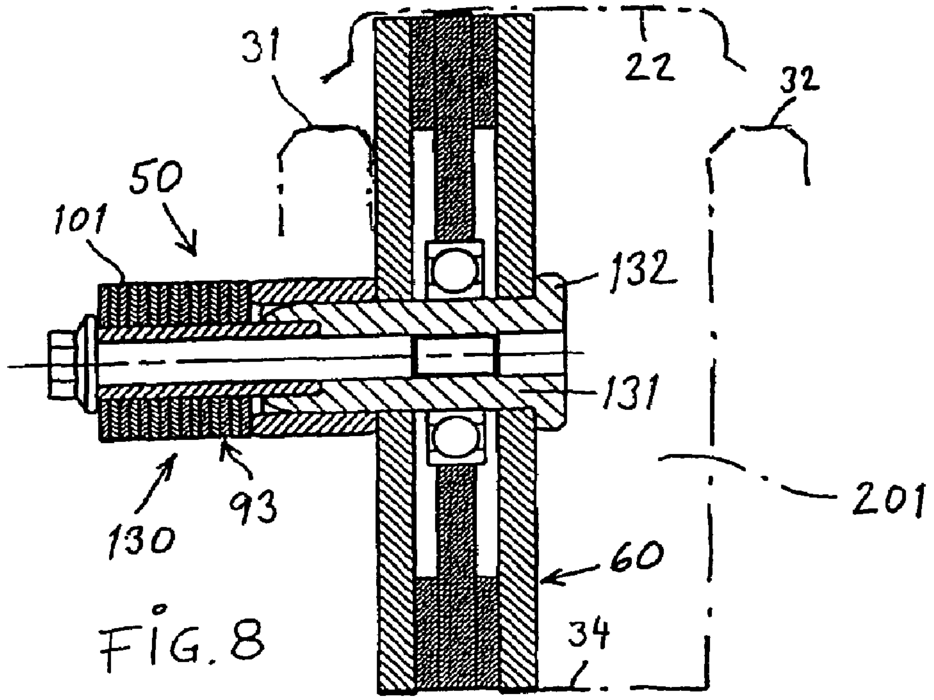

Exemplifying embodiments of the invention will now be described in more detail with reference to the accompanying drawings, in which FIG. 1 is a perspective view of an inventive arrangement fitted to the tip of a crane arm and supporting a gripping tool, FIG. 2 is an exploded perspective view showing a first embodiment of a swing damper that includes an inventive arrangement, FIG. 3 is a vertical sectional view of a pivot joint according to FIG. 2, FIG. 4 is a vertical sectional view of the arrangement shown in FIG. 2, FIG. 5 is a vertical sectional view of the brake arrangement shown in FIGS. 2 and 4, FIG. 6 is an exploded perspective view of a second embodiment of a swing damper that includes an inventive arrangement, FIG. 7 is a vertical sectional view of the brake arrangement shown in FIG. 6, and FIG. 8 is a vertical sectional view of a third embodiment of the brake arrangement.

FIG. 1 shows an inventive swing damper 1 that is pivotally mounted on the tip of a crane arm 2 through the medium of a pivot joint/bearing 3. The swing damper 1 carries at its lower end a rotator 4, which, in turn, carries a tool in the form of a gripping device 5.

The pivot joint/bearing 3 permits free pendulous movement/pivotal movement about a shaft 6 and the rotator 4 enables the gripping device 5 to be maneuvered rotatably, said rotator being driven hydraulically in the illustrated embodiment. Hydraulic hoses connected to the rotator and the gripping device have not been shown for the sake of clarity.

The swing damper 1 includes an upper part 11, which is connected to the crane arm 2 for free pivotal movement relative thereto, via the pivot joint 3. The swing damper 1 also includes a bottom part 12, which carries the tool 5, via the rotator 4 for instance. The upper part 11 includes an attachment lug 15, which co-acts with the pivot joint 3. The bottom part 12 includes an attachment 16 for attachment of the rotator 4 or, alternatively, for direct connection to the tool 5.

The upper part 11 and the bottom part 12 are pivotally connected to each other via a pivot bearing 13, wherewith relative pivotal movement of the upper part 11 and lower part 12 is effected about a pivot shaft 14. The pivot shaft 14 is generally positioned at right angles to the pivot shaft 6. This provides the mobility desired of the tool 5.

The swing damper 1 includes a brake arrangement 50 which functions to dampen relatively quickly the swinging movement of the tool 5 when manoeuvring the crane arm wherewith the swinging movement about the pivot shaft 14 is retarded in the way desired.

The brake arrangement 50 included in the swing damper 1 has the form of a disc brake assembly, which is described in more detail hereinafter.

In the case of the illustrated embodiment, the upper part 11 comprises two downwardly facing attachment lugs 20,21 and an abutment surface, or shoulder, 22 disposed between said lugs. The attachment lugs 20,21 include a circular hole 23, each of which accommodates a respective circular plain bushing or sliding bearing bushing 24.

The lower part 12 includes four upwardly facing attachment lugs 30-33 which engage the downwardly facing lugs 20,21 in a forked-like fashion, as will be evident from the figures. A lower abutment surface or shoulder 34 is disposed between the upwardly facing lugs 31 and 32. The outermost lugs 30,33 include a circular hole 35 and the innermost lugs 31,32 include a circular hole 36. The hole 36 includes a circular countersink 37 of larger diameter than that of the hole 36, as will be evident from the figures.

The upper part 11 and the lower part 12 are pivotally joined and held together by two supportive sleeves 40,41. The sleeves 40,41 each include an outer flange 42 which lies in abutment with the outer surface of respective outer lugs 30,33, wherein said sleeves 40,41 are fixed in position by means of a locking ring 43 received in the countersink 37 of the inner lugs 31,32. The locking rings 43 are anchored to the sleeves 40,41 by means of a number of locking screws 44, wherein the locking rings 43 include countersinks for receiving the heads 45 of the screws 44. The aforesaid assembly provides a self-holding and load-supporting transfer between the upper part 11 and the lower part 12, wherewith said parts

11,12 are able to pivot by virtue of a sliding bearing surface 46 located between the sliding bearing bushings 24 and the sleeves 40,41. The construction of the pivot bearing 13 will be apparent from FIG. 3.

The brake arrangement 50 is, in accordance with the invention, designed to brake or retard the pivotal movement between the upper part 11 and the lower part 12.

The inventive brake arrangement 50 can be fitted readily to the pivotal joint 13 shown in FIG. 3.

The brake arrangement 50 includes a brake unit 60 which comprises a central brake disc 70, which includes a brake lining, and two outer brake discs 80.

The central disc 70 includes an upper abutment surface 71 that abuts with the upper abutment surface 22 between the downwardly facing attachment lugs 20,21 of the upper part 11. This ensures that the disc 70 will be locked against rotation relative to the upper part 11. The lower portion of the disc 70 has a semi-circular rounding 72 that enables the disc 70 and the lower part 12 to swing relative to one another. The disc 70 also includes a circular centre hole 73, which accommodates a bearing 74, for instance a ball bearing. It is, of course, possible to use other types of bearings. The brake disc 70 carries annular brake linings 75 on its respective side surfaces, as evident from the figures.

The outer brake discs 80 include a lower abutment surface or shoulder 81, which abuts with the lower abutment surface or shoulder 34 between the upwardly facing attachment lugs 31 and 32 on the lower part 12. This ensures that the brake discs 80 will be locked against rotation relative to the lower part 12. The upper portion of the brake discs 80 has a semi-circular rounding 82 which enables the brake discs 80 and the upper part 11 to pivot relative to one another. The brake discs 80 includes a circular centre hole 83.

The brake arrangement 50 also includes a tensioning element which functions to compress the brake unit 60 when braking.

FIGS. 2, 4 and 5 illustrate a double-sided tensioning element 90, which is based on the action of a spring force. FIGS. 6 and 7 illustrate a double-sided tensioning element 110 which is based on the action of a pressurised medium. FIG. 8 illustrates a single-sided tensioning element 130, which is based on the action of a spring force.

As will be seen from FIGS. 2, 4 and 5, the tensioning element 90 is comprised of two force-transmitting circular sliding sleeves 91,92 disposed within the carrier sleeves 40,41 and within the locking rings 43. One end of the sliding sleeves 91,92 abuts said outer brake discs 80 and the other end abuts a spring-force-exerting device in the form of a spring pack 93,94 consisting of mutually opposed cup springs 101. A circular centre tube 95 is disposed inside the sliding sleeves 91,92. The centre tube 95 has a threaded centre hole 96 and two end recesses 97. The centre tube 95 extends through the centre hole 83 in the brake discs 80 and also through the centre hole in the bearing 74 of the central disc 70. One purpose of the centre tube 95 is to centre the brake unit 60 relative to the pivot shaft 14 and to take-up the shear forces generated during a braking action. Desired braking torque is set by tightening screws 98,99 whose heads act to compress the spring pack 93,94, wherewith the threaded end of respective screws engage the threaded centre hole 96 of the centre tube 95. Maximum tightening of the screws is limited by a circular spacing sleeve 100 which surrounds the screws 98,99, wherewith one end of the sleeves 100 abuts the screw head and the other end of the sleeves comes into contact with the bottom of respective end recesses 97 in the centre tube 95 when reaching maximum tightening of the screws. If desired, the spacing sleeves 100 can be formed in one piece with the screws 98,99.

In FIG. 4, the screw 98 is shown in a maximum tightened state, whereas the screw 99 is shown in a state at the beginning of a tightening stage. FIG. 5 shows both screws 98,99 tightened to a maximum.

It will be seen that a desired braking torque or braking force can be set by appropriate tightening of the screws 98,99. It will be understood that by using a relatively large number of cup springs 101 in the spring packs 93,94, it is possible to decrease the rate at which braking torque/braking force is reduced when the brake linings 75 become worn, which results in longer time intervals between subsequent adjustments to the braking torque required as a result of such wear. Thus, the desired braking effect can be achieved by virtue of the spring packs 93,94 compressing the brake unit 60 via the sliding sleeves 91,92, so as to press the discs 70 and 80 together.

It will be understood that the described tensioning element 90 can be constructed in many different ways. For example, the spring force/pre-tensioning force can be obtained with the aid of helical springs or some other type of spring means. Moreover, the tensioning element can be comprised of different components than those described, within the concept of the invention As shown in FIGS. 6 and 7, the tensioning element 110, operated on the basis of a pressure medium, is comprised of a circular, sliding sleeve 111 which includes end-walls and which is disposed within the carrier sleeve 40 and its locking ring 43. One end of the sliding sleeve 111 abuts one of the outer brake discs 80 and the sleeve 111 includes at its other end a hole-equipped end-wall 112. A cylindrical tube 113 is disposed within the carrier sleeve 41 and its lock ring 43 and which includes two abutment surfaces or shoulders 114 and 115. The abutment surface 114 is located within the carrier sleeve 41 and the lock ring 43, while a further abutment surface 116 located between the shoulders 114 and 115 is in abutment with one of the outer brake discs 80, as shown in FIG. 7. The abutment surface 115 extends through the centre holes 83 in said brake discs 80 and also through the centre hole in the bearing 74 of the central disc 70. The free end of the abutment surface/shoulder 115 extends into the slide sleeve 111. The cylindrical tube 113 includes two circular centre holes 117 and 118. The centre hole 117 serves as a pressure-medium cylinder that houses a plunger 120. The plunger 120 carries a pull rod 121 whose free end 122 is anchored to the end-wall 112 of the sliding sleeve 111 by means of a nut 123. A pressure chamber 124 is located between the plunger 120 and the cylindrical tube 113, this arrangement including, of course, the necessary seals. The supply of pressure medium to the pressure chamber 124 is effected through the means of a hydraulic line connection 125. Thus, the braking torque can be set to a desired magnitude, by controlling the pressure of the medium delivered to the pressure chamber 124. A desired braking effect is obtained by compression of the brake unit 60 by means of the sliding sleeve 111 and the cylindrical tube 113 through the action of said pressure medium, therewith pressing the discs 70 and 80 together. Such pressure medium control can also be achieved to enable the braking torque to be varied in accordance with requirements and to achieve a specially-adapted braking pattern, which can be automated.

It will also be understood that the design of the tensioning element 110 described above can also be varied in many ways within the scope of the inventive concept.

The tensioning element 130 illustrated in FIG. 8 is constructed in accordance with the same basic concept as that applied with regard to the tensioning element 90. In the case of the FIG. 8 embodiment, the centre tube 131 of the tensioning element 130 includes an end flange 132 which lies in abutment with one of the outer brake discs 80. The single-sided tensioning element 130 enables a side space 201 in the brake unit 60 to be used for location of a cable and/or a hose for instance, or for some other purpose. A pressure-medium-based tensioning element 110 can be made single-sided in a corresponding manner, if so desired. The presence of a side space 201 is indicated in chain lines in FIG. 8.

Thus, the brake unit 60 can fill the space 200 between the lugs 31 and 32, either completely or partially, see FIG. 3.

It will be understood from the aforegoing that the outer brake discs 80 accompany the movement of the lower part 12 and that the central disc 70 accompanies the movement of the upper part 11, wherewith compression of the brake discs results in braking of the swinging movement between the upper part 11 and the lower part 12. When wishing to increase the braking effect, the brake unit 60 of the brake arrangement 50 may, of course, be provided with several inventive brake disc assemblies, etc.

It will be noted that worn brake discs can be replaced very readily, since it is only necessary to dismantle and remove the tensioning devices concerned, therewith enabling the brake unit 60 to be removed sideways, as illustrated in FIGS. 2 and 6. A new brake unit 60 is then fitted from one side and the tensioning element concerned is then mounted in place, and so on. Thus, brake discs can be replaced without needing to remove the carrier sleeves 40,41 and the locking rings 43. The pivot bearing 13 is thus not affected by a brake unit change. This is highly beneficial from a servicing aspect.

In the illustrated embodiments, the disc 70 carrying said brake lining has been secured against rotation relative to the upper part 11 and the brake discs 80 have been secured against rotation relative to the lower part 12. It will be understood, however, that it lies within the framework of the inventive concept to secure the disc 70 against rotation relative to the lower part 12 and to secure the brake discs 80 against rotation relative to the upper part 11, even though this structural solution is less beneficial. It will also be understood that the number of discs or the number of brake units can be varied as required and desired, as can also the positioning of the brake linings within the brake unit.

In the case of a simplified embodiment, there can be used a brake unit that includes one single brake disc 80 and one single disc 70 which includes a brake lining, wherewith the brake lining 75 is disposed in this case only on that side of the disc 70 which faces towards the brake disc 80. The tensioning element is designed to press the brake disc 80 against the disc 70 in conjunction with a braking operation.

It will be noted that many structural variations can be made within the scope of the present invention.

Although the swing damper of the illustrated embodiment is a single-type damper, it will be understood that the inventive arrangement can also be used in a double-type damper, wherewith swinging movement about the pivot bearing 3 and the pivot bearing 13 can be dampened by means of inventive arrangements.

It will also be understood that the described components of the swing damping arrangement can be replaced with functionally equivalent components within the framework of the inventive concept. It is, of course, possible to vary the choice of material.

It will also be noted that the lower part 11 can be integrated with, e.g., an underlying rotator 4, which will then also include certain rotator components.

Thus, the invention is not restricted to the illustrated and described embodiment, since changes and modifications are possible within the scope of the accompanying Claims.

The invention claimed is:

1. A swing damping arrangement, particularly an arrangement pertaining to a swing damper (1) for supporting a tool (5) or working implement that hangs from a crane arm (2), wherein the damper (1) includes an upper part (11) connected to the crane arm (2), and a lower part (12) which supports a tool (5) or working implement, either directly or via a rotator (4) for instance, wherein the upper part (11) and the lower part (12) are pivotally connected to each other via a pivot joint (13), and wherein the damper (1) includes a brake arrangement (50), characterised in that the brake arrangement (50) includes a brake unit (60) having discs (70, 80) that can swing around the pivot axle (14) of the pivot joint (13), in that at least one (70) of said discs is secured against rotation relative to the upper part (11), in that at least one (80) of said discs is secured against rotation relative to said lower part (12), in that the arrangement includes a tensioning element (90; 110; 130) which functions to press the discs (70, 80) together in a braking operation, and in that the tensioning element (90; 110; 130) is located at least partially within one or two pivot bearings (46) located between the upper part (11) and the lower part (12).

2. An arrangement according to claim 1, characterised in that the brake unit (60) is situated in a space (200) between two pivot bearings (46) located between the upper part (11) and the lower part (12).

3. An arrangement according to claim 1, characterised in that the upper part (11) includes an abutment surface (22) for driving at least one disc (70).

4. An arrangement according to claim 1, characterised in that the lower part (12) includes an abutment surface (34) for driving at least one disc (80).

5. An arrangement according to claim 1, characterised in that at least one disc (70) has a brake lining (75) on at least one side thereof.

6. An arrangement according to claim 1, characterised in that discs (70, 80) include a through-passing hole for the tensioning element (90; 110; 130).

7. An arrangement according to claim 1, characterised in that the force generated by the tensioning element (90; 110; 130) in order to press the discs (70, 80) together is based on a spring force and/or on the application of a pressure medium.

8. A method relating to a swing damper, particularly to a swing damper (1) for carrying a tool (5) or working implement that hangs from a crane arm (2), wherein the swing damper (1) includes an upper part (11) which is connected to the crane arm (2), and a lower part (12) which carries a tool (5) or working implement, either directly or via a rotator (4) for instance, wherein the upper part (11) and the lower part (12) are pivotally connected together via a pivot joint (13), and wherein the swing damper (1) includes a brake arrangement (50), characterised in that swinging movement is braked by virtue of said upper part (11) being caused to entrain at least one disc (70) of a brake unit (60) as said part swings, and by virtue of the lower part (12) being caused to entrain at least one disc (80) of the brake unit (60) as said lower part (12) swings, and in that the discs (70, 80) are pressed together by a tensioning element (90; 110; 130) in a braking operation where the tensioning element (90; 110; 130) is located at least partially within one or two pivot bearings (46) located between the upper part (11) and the lower part (12).

9. An arrangement according to claim 2, characterised in that the upper part (11) includes an abutment surface (22) for driving at least one disc (70).

10. An arrangement according to claim 2, characterised in that the lower part (12) includes an abutment surface (34) for driving at least one disc (80).

11. An arrangement according to claim 3, characterised in that the lower part (12) includes an abutment surface (34) for driving at least one disc (80).

12. An arrangement according to claim 2, characterised in that at least one disc (70) has a brake lining (75) on at least one side thereof.

13. An arrangement according to claim 3, characterised in that at least one disc (70) has a brake lining (75) on at least one side thereof.

14. An arrangement according to claim 4, characterised in that at least one disc (70) has a brake lining (75) on at least one side thereof.

15. An arrangement according to claim 2, characterised in that discs (70, 80) include a through-passing hole for the tensioning element (90; 110; 130).

16. An arrangement according to claim 3, characterised in that discs (70, 80) include a through-passing hole for the tensioning element (90; 110; 130).

17. An arrangement according to claim 4, characterised in that discs (70, 80) include a through-passing hole for the tensioning element (90; 110; 130).

18. An arrangement according to claim 5, characterised in that discs (70, 80) include a through-passing hole for the tensioning element (90; 110; 130).

19. An arrangement according to claim 2, characterised in that the force generated by the tensioning element (90; 110; 130) in order to press the discs (70, 80) together is based on a spring force and/or on the application of a pressure medium.

20. An arrangement according to claim 3, characterised in that the force generated by the tensioning element (90; 110; 130) in order to press the discs (70, 80) together is based on a spring force and/or on the application of a pressure medium.

* * * * *

UNITED STATES PATENT AND TRADEMARK OFFICE

CERTIFICATE OF CORRECTION

PATENT NO. : 7,721,857 B2
APPLICATION NO. : 10/530158
DATED : May 25, 2010
INVENTOR(S) : Joakim Harr It is certified that error appears in the above-identified patent and that said Letters Patent is hereby corrected as shown below:

Title Page item 57, Substitute the following Abstract of the Disclosure for the Abstract printed on the cover sheet of the patent.

ABSTRACT OF THE DISCLOSURE

The present invention relates to an arrangement and to a method relating to a swing damper (1) for carrying a tool (5) that hangs from a crane arm (2). The swing damper (1) includes an upper part (11) connected to the crane arm (2), and a lower part (12) that carries a working implement (5) either directly or via a rotator (4),. The upper and lower parts are pivotally connected via a pivot joint (13). The swing damper (1) also includes a brake arrangement (50) including a brake unit (60) having discs (70, 80) pivotal about a pivot shaft (14) of the swing joint (13), at least one (70) of the discs being secured against rotation relative to the upper part (11), and at least one (80) of the discs being secured against rotation relative to said lower part (12), and a tensioning element (90; 110; 130) for pressing the discs (70,80) together in a braking operation.

Column 2, Line 11: After “tool”, insert --5 or working implement--.

Column 2, Line 12: Delete “5”.

Column 2, Line 15: Delete “5”.

Signed and Sealed this
Twenty-sixth Day of April, 2011

David J. Kappos
*Director of the United States Patent and Trademark Office*